United States Patent
Chang et al.

(10) Patent No.: US 9,272,917 B2
(45) Date of Patent: Mar. 1, 2016

(54) METHOD OF PREPARING MESOPOROUS SILICA PARTICLES USING SPRAY PYROLYSIS

(71) Applicant: KOREA INSTITUTE OF GEOSCIENCE AND MINERAL RESOURCES, Daejeon (KR)

(72) Inventors: Han Kwon Chang, Daejeon (KR); Hee Dong Jang, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 605 days.

(21) Appl. No.: 13/677,194

(22) Filed: Nov. 14, 2012

(65) Prior Publication Data

US 2014/0017154 A1    Jan. 16, 2014

(30) Foreign Application Priority Data

Jul. 12, 2012   (KR) ........................ 10-2012-0076296

(51) Int. Cl.
*C01B 33/12*    (2006.01)
*C01B 33/18*    (2006.01)

(52) U.S. Cl.
CPC .............. *C01B 33/18* (2013.01); *C01P 2004/32* (2013.01); *C01P 2006/16* (2013.01)

(58) Field of Classification Search
None
See application file for complete search history.

(56) References Cited

FOREIGN PATENT DOCUMENTS

| KR | 2003-0093814 | 12/2003 |
| KR | 10-2010-0010350 | 2/2010 |
| KR | 10-2010-0128628 | 12/2010 |

OTHER PUBLICATIONS

Cho et al(Mechanisms of Formation of Silica Particles from Precursors with Different Volatilities by Flame Spray Pyrolysis, Aerosol Sci and Tech, 43, 2009, 911-920).*
Lu et al(Aerosol-assisted self-assembly of mesostructured spherical nanoparticles, Nature, vol. 398, (1999), pp. 223-226).*
Kim et al(Characterization of mesoporous alumina particles prepared by spray pyrolysis of Al(NO3)2 9H2O precursor: Effect of CTAB and urea, Microporous and Mesoporous Mats., 128 (2010) 85-90).*
Huo et al(Preparation of Hard Mesoporous Silica Spheres, Chem Mater, 1997, 9, 14-17).*
Kim et al, "Formation of spherical hollow silica particles from sodium silicate solution by ultrasonic spray pyrolysis method." Colloids and Surfaces A: Physicochemical and Engineering Aspects 254.1 (2005): 193-198).*
W. Guo, et al. "Interaction of PEG with ionic surfactant SDS to form template for mesoporous material", Colloids and Surfaces A: Physicochem. Eng. Aspects, vol. 252, 2005, pp. 71-77.
Chang, et al., "Pore-Controlled Synthesis of Mesoporous Silica Particles by Spray Pyrolysis from Aqueous Silicic Acid," Particle and Aerosol Research, Jun. 2012, pp. 89-95, vol. 8, No. 2.

* cited by examiner

*Primary Examiner* — Melvin C Mayes
*Assistant Examiner* — Michael Forrest
(74) *Attorney, Agent, or Firm* — Lewis Roca Rothgerber Christie LLP

(57) ABSTRACT

Disclosed is a method of preparing mesoporous silica particles. The method includes (a) preparing an aqueous silicic acid, (b) spraying the aqueous silicic acid in a droplet state by activating the aqueous silicic acid, and (c) pyrolyzing the sprayed droplet through a reactor, which is previously heated, by allowing the sprayed droplet to pass through the reactor together with a carrier gas. The aqueous silicic acid includes 0.4 M to 0.8 M of silicic acid.

5 Claims, 12 Drawing Sheets

METHOD OF PREPARING MESOPOROUS SILICA PARTICLES USING SPRAY PYROLYSIS

CROSS-REFERENCE TO RELATED APPLICATION

This application claims the benefit under 35 U.S.C. §119 of Korean Patent Application No. 10-2012-0076296 filed on Jul. 12, 2012 in the Korean Intellectual Property Office, the entirety of which disclosure is incorporated herein by reference.

BACKGROUND OF THE INVENTION

1. Field of the Invention

The present invention relates to a method of preparing porous silica particles. More particularly, the present invention relates to a method of preparing mesoporous silica particles using a spray pyrolysis scheme.

2. Description of the Related Art

Pores are classified into micropores having the particle size of 2 nm or less, mesopores having the particle size of 2 nm to 50 nm, and macropores having the particle size of 50 nm or more according to the particle sizes thereof.

Meanwhile, the mesoporous silica has been applied to various fields such as a catalyst, absorption, a molecular sieve, a gas sensor, ion exchange, and the delivery of chemicals.

Various schemes have been generally known in order to prepare a mesoporous silica material in a film type, or a spherical type, as well as the bulk type. Among them, a liquid-phase synthesis scheme generally includes a scheme of simply employing a surfactant and a synthetic scheme of employing amphiphilic block copolymers. A gas-phase synthesis scheme mainly includes a synthesis scheme of employing organic particles for a template. According to the gas-phase synthesis scheme, consecutive processes are possible, and the preparation process can be easily expanded for the purpose of mass production when comparing with the liquid-phase synthesis scheme.

Meanwhile, in order to variously apply mesoporous silica particles, the porous characteristics such as the size of particles, a pore size, a pore volume, and the specific surface area must be essentially controlled. In general, to control the above porous characteristics, the size of the polystyrene organic particles used for a template has been adjusted, and the content of polymer such as styrene or polyethylene glycol (PEG) has been adjusted.

Although tetrachloride silicon ($SiCl_4$) and alkoxysilane such as and tetraethyl orthosilicate (TEOS) have been used as the source material of silica, they represent disadvantages of strong corrosivity, high harmfulness to an environment, and a high price.

As the related art of the present invention, a manufacturing method of silica powders using an ultrasonic spray pyrolysis method has been disclosed in Korean Unexamined Patent Publication No. 10-2010-0128628 (published on Dec. 8, 2010).

SUMMARY OF THE INVENTION

An object of the present invention provides a method of preparing mesoporous silica particles using a spray pyrolysis scheme.

In order to accomplish the above object of the present invention, there is provided a method of preparing mesoporous silica particles. The method includes (a) preparing an aqueous silicic acid, (b) spraying the aqueous silicic acid in a droplet state by activating the aqueous silicic acid, and (c) pyrolyzing the sprayed droplet through a reactor, which is previously heated, by allowing the sprayed droplet to pass through the reactor together with a carrier gas. The aqueous silicic acid includes 0.4 M to 0.8 M of silicic acid.

In this case, the spraying of the aqueous silicic acid in the droplet state by activating the aqueous silicic acid is performed through an ultrasonic spraying scheme.

In addition, preferably, the reactor is previously heated at a temperature of 550° C. to 850° C.

In addition, the aqueous silicic acid may further include an expansion aid. In this case, the expansion aid may include urea. In addition, preferably, the expansion aid has a concentration of 2 M or less based on 1 M of the silicic acid.

In addition, the aqueous silicic acid may further include an organic template. In this case, preferably, the organic template includes at least one of polyethylene glycol (PEG), polypropylene glycol (PPG), and polyvinyl pyrrol didon (PVP). In addition, the organic template is contained with a content of 10.0 weight part or less based on 100 weight part of the aqueous silicic acid.

As described above, according to a method of preparing mesoporous silica particles using a spray pyrolysis scheme of the present invention, mesoporous silica particles having a main pore of about 3.8 mm can be prepared by using aqueous silicic acid, which may be prepared at a low price, as a starting material.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
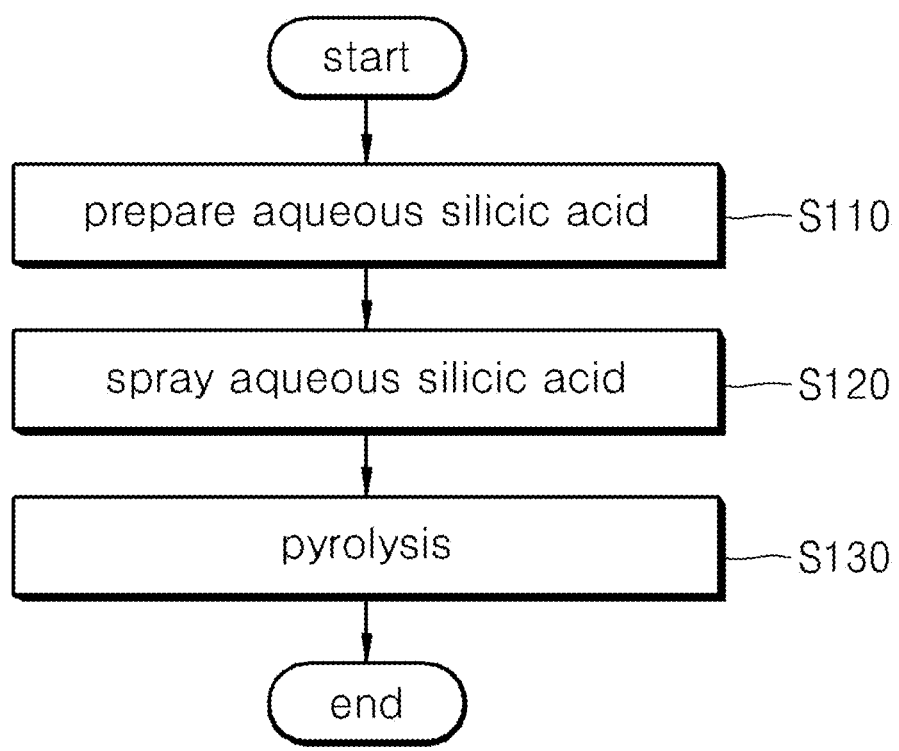
FIG. 1 is a flowchart schematically showing a method of preparing mesoporous silica particles using a spray pyrolysis scheme according to the embodiment of the present invention.

The advantages, the features, and schemes of achieving the advantages and features will be apparently comprehended by those skilled in the art based on the embodiments, which are detailed later in detail, together with accompanying drawings. The present invention is not limited to the following embodiments but includes various applications and modifications. The embodiments will make the disclosure of the present invention complete, and allow those skilled in the art to completely comprehend the scope of the present invention. The same reference numerals will be assigned to the same elements throughout the whole description.

Hereinafter, a method of preparing mesoporous silica particles using a spray pyrolysis scheme according to an exemplary embodiment of the present invention will be described in detail with reference to accompanying drawings.

FIG. 1 is a flowchart schematically showing a method of preparing mesoporous silica particles according to the embodiment of the present invention.

Referring to FIG. 1, the method of preparing the mesoporous silica particles according to the present invention includes a step of preparing an aqueous silicic acid (step S110), a spraying step (step S120), and a pyrolyzing step (step S130).

First, according to the step of preparing the aqueous silicic acid (step S110), the aqueous silicic acid is prepared as a starting solution of silica.

According to the present invention, the aqueous silicic acid, which can be easily synthesized from a siliceous mudstone representing high domestic reserves at a low price, is used as the starting solution of silica particles Preferably, the aqueous silicic acid contains 0.4 M to 0.8 M of silicic acid. If the concentration of the silicic acid is less than 0.4 M, the size and the specific surface area of the prepared silica particles may be reduced. In contrast, if the concentration of the silicic acid exceeds 0.8M, the silica particles may be excessively coarsened without the increase of the specific surface area.

Then, according to the spraying step (step S120), the aqueous silicic acid is sprayed in a droplet state by activating the aqueous silicic acid. The spraying may be performed through an ultrasonic spraying scheme.

When the ultrasonic spraying scheme is performed, carrier gas is air, and may be supplied at the flow rate of about 1.0 L/min.

Thereafter, in the pyrolyzing step (step S130), the sprayed droplet passes through a previously heated reactor together with the carrier gas, so that the droplet is pyrolyzed through the reactor. In this case, the droplet is oxidized while being pyrolyzed, so that the silica particles may be prepared.

Preferably, the reactor is heated at the temperature of 550° C. to 850° C. If the temperature of the reactor is less than 550° C., the spray pyrolytic efficiency may be insufficient. In contrast, if the temperature of the reactor exceeds 850° C., only the preparation cost of the silica particles may be increased without the additional effect.

Meanwhile, the aqueous silicic acid may further include an expansion aid. The expansion aid contributes to the increase of the pore volume of the prepared silica particle and the specific surface area of the prepared silica particles.

The expansion aid may include urea.

Preferably, the expansion aid is contained with the concentration of 2 mol based on 1 mol of the silicic acid. If the concentration of the expansion aid exceeds 2 mols based on 1 mol of the silicic acid, only the preparation cost of the silica particles may be increased without the additional effect.

In addition, the aqueous silicic acid may further include an organic template to facilitate the formation of pores. The organic template may include at least one of polyethylene glycol (PEG), polypropylene glycol (PPG), and polyvinyl pyrrol didon (PVP).

Preferably, the organic template is contained with the content of 10.0 weight part or less based on 100 weight part of the aqueous silicic acid. If the content of the organic template exceeds the content of 10.0 weight part with respect to the aqueous silicic acid, the pore volume may be significantly reduced, but the pore size of the prepared silica particles may be remarkably increased.

The silica particles prepared through the above method may be mesoporous silica particles including a main pore having an average particle size of about 3.8 nm.

If the organic template is added, a stabilizer may be additionally contained to the extent that the ratio of the stabilizer to the organic template is the ratio of 1:1, so that the aqueous silicic acid can be stabilized. In addition, to remove a residual carbon component after the silica has been prepared, heat treatment may be additionally performed.

Embodiment

Hereinafter, the method of preparing mesoporous silica particles using the spray pyrolysis scheme according to the exemplary embodiment of the present invention will be described. The exemplary embodiment is provided only for the illustrative purpose, and the present invention is not limited thereto.

Since other advantages and other characteristics that are not described herein can be sufficiently and technically comprehended by those skilled in the art, the details thereof will be omitted in order to avoid redundancy.

1. Source Material

The aqueous silicic acid serving as a source material was prepared from a sodium silicate solution ($Na_2SiO_3$, OCI Co., Korea) through an ion exchange scheme. After diluting the sodium silicate solution by using deionized water, the sodium silicate solution passed through an ion exchanger (having the diameter of 50 mm and resin filling height of 650 nm), which had been filled with hydrogen cation-exchange resin (TRI-LITE MC-1, Samyang Co., Korea), at the flow rate of 10 L/min, so that the aqueous silicic acid was prepared. The aqueous silicic acid was adjusted to the concentration of 0.2 M, 0.5 M, or 0.7 M by using the deionized water and prepared as the starting solution.

Meanwhile, in order to control the porous characteristic of porous particles, urea (($NH2)2CO$, Sigma-Aldrich) serving as the expansion aid and PEG (M.W. 16,000 to 24,000, Fluka) serving as the organic template were added to the aqueous silicic acid. In this case, the concentration of the aqueous silicic acid was fixed to 0.5 M, and the urea was added to the extent that the molar concentration ratio of urea to silicic acid is 1. In addition, when the PEG was added to the aqueous silicic acid, the PEG is contained in the state that the PEG is mixed with Tween 20 (Sigma-Aldrich) serving as a stabilizer to the extent that the ratio of the PEG to the Tween 20 is the ratio of 6:5 in terms of weight. In this case, the content of PEG was adjusted to 0.6 weight part, 3 weight part, or 6 weight part based on 100 weight part of the aqueous silicic acid.

2. Experimental Equipment

Figure 2:
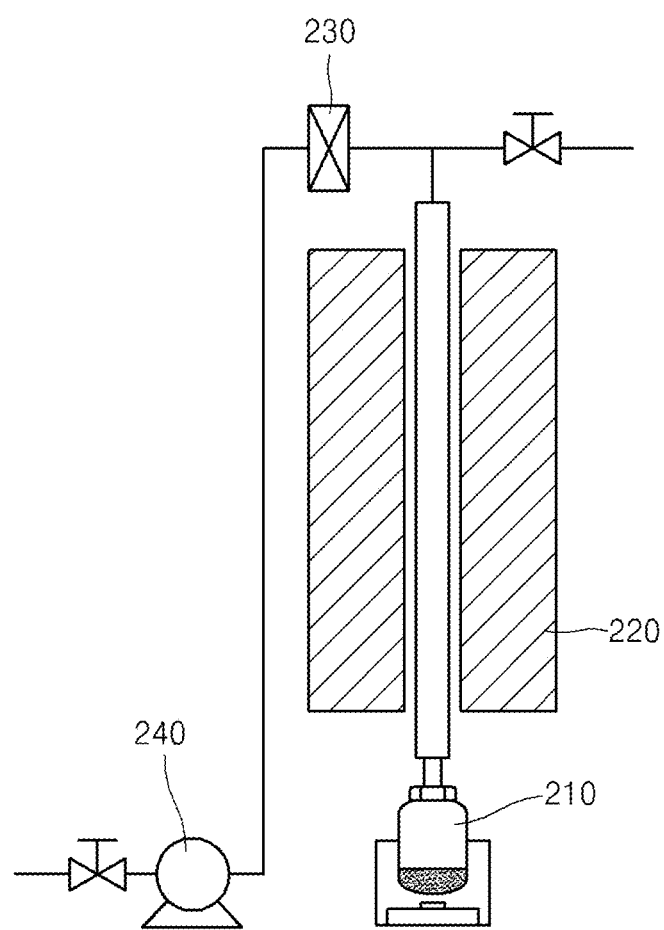
FIG. 2 is a view showing schematically a spray pyrolysis device according to the embodiment of the present invention.

The schematic view of the experimental equipment to prepare porous silica particles through the spray pyrolysis scheme is shown in FIG. 2. An ultrasonic sprayer (vacuum frequency: 1.7 MHz) 210 to spray a solution including a starting source material, a tubular electric furnace (the length of the heated region is 540 mm, and the diameter of the heated region is 25 mm) 220 for the purpose of the pyrolyzing the droplet of the source material, a filter (PTFE, Pore size 1.2

μm, Sartorius AG, Germany) 230 to capture the prepared porous silica, and a vacuum pump 240 were prepared.

The solution including the source material was sprayed in the form of a fine droplet having the micron size by the ultrasonic sprayer 210. The sprayed droplet was subject to the pyrolysis procedure while passing through the tubular electric furnace 220 heated at the temperature of 600° C. to 800° C. together with air (flowing at the flow rate of 1 L/min) serving as the carrier gas, thereby preparing the porous silica particles.

Meanwhile, when PEG was added, in order to remove residual carbon from the silica particles, after 0.1 g of the prepared silica particles was contained in the alumina boat and then introduced into the tubular electric furnace 220 heated at the temperature of 700° C., heat treatment was performed for 2 hours while allowing air to constantly flow at the flow rate of 1 L/min.

3. Evaluation of Particle Characteristic

The shape of porous silica particles was observed through a field emission scanning electron microscope (FE-SEM; S-4800, Hitachi), and the average size of the silica particles was measured by using a particle size analyzer (Mastersizer 2000, Malvern) based on light diffusion.

The characteristic of the mesopores was analyzed through a nitrogen adsorption-desorption scheme. The nitrogen adsorption-desorption isotherm curve was measured by using the analyzer (Quadrasorb SI, Quantachrome) for a specific surface area and a pore size after degasfication of a test sample at the temperature of 200° C. for 2 hours.

The specific surface area was measured through a multi-point Barratt-Emmett-Teller (BET) scheme by using 7 points from the adsorption isotherm curve at the relative pressure of 0.05 to 0.3, and the correlation coefficient was 0.999 or more. The distribution of the pore size was obtained from the desorption isotherm curve through a Barrett-Joyner-Halanda (BJH) scheme. The total pore volume was obtained at the relative temperature of 0.995.

Figure 3:
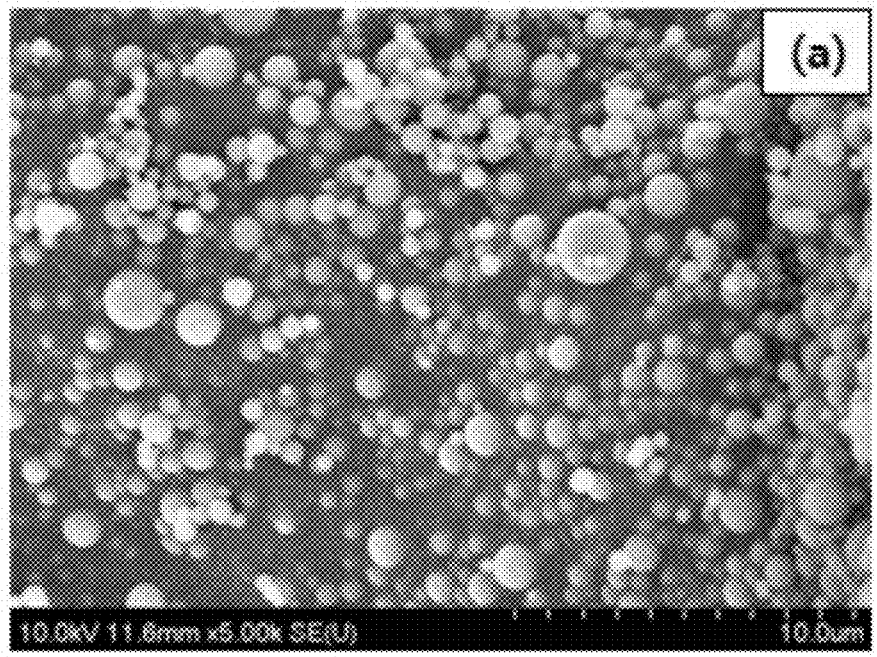
FIGS. 3 to 5 are FE-SEM photographs showing silica particles prepared by using aqueous silicic acids having the silicic acid concentrations of 0.2 M, 0.5 M and 0.7 M, respectively.
Figure 4:
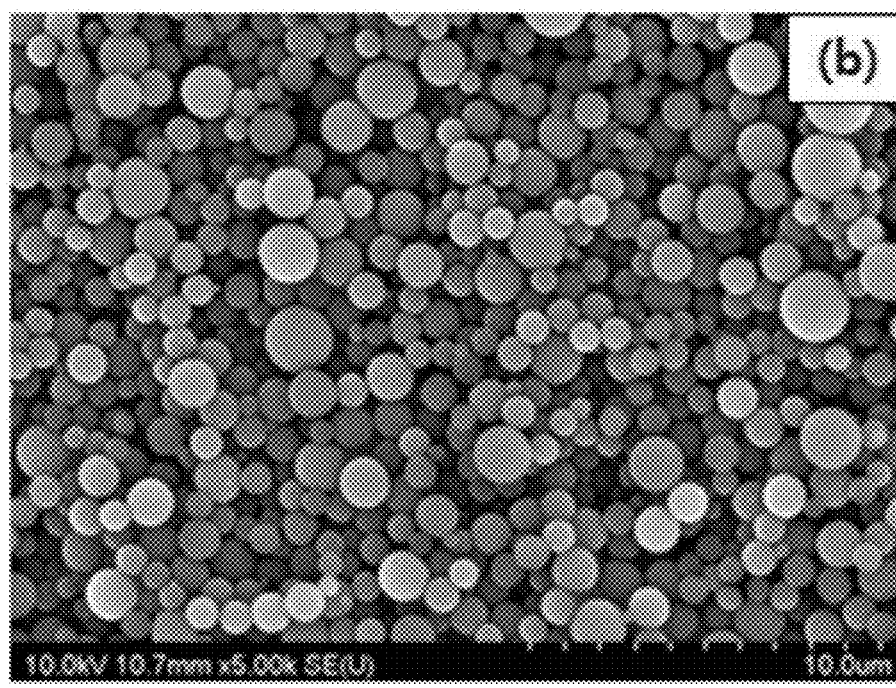
Figure 5:
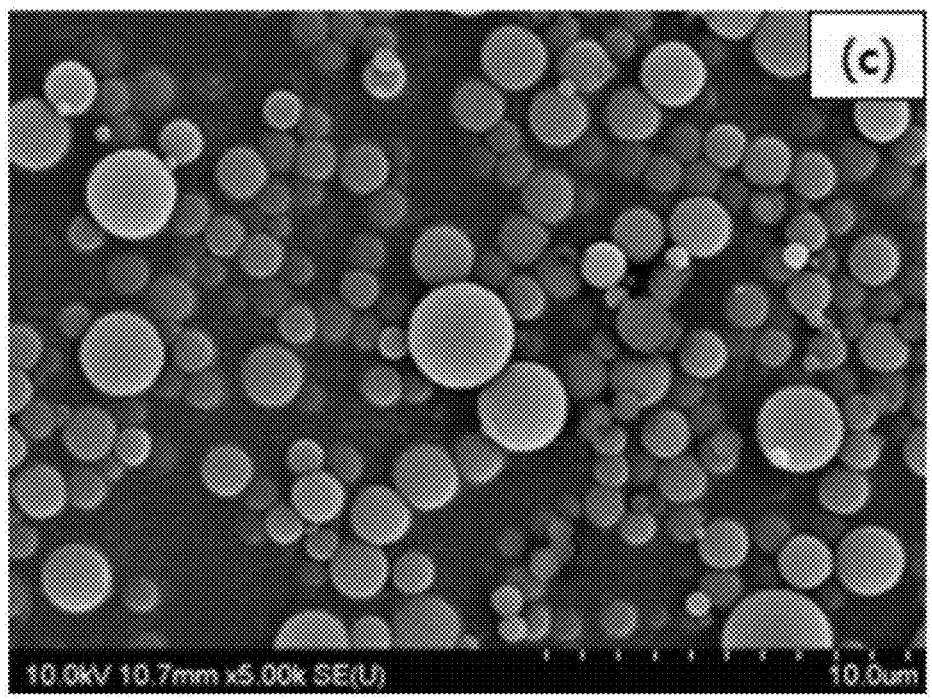

4. Result of Evaluation for Particle Characteristic (1) Result of Evaluation for Particle Characteristic According to Concentrations of Aqueous Silicic Acid FIGS. 3 to 5 are FE-SEM photographs showing silica particles prepared from the aqueous silicic acids having 0.2 M of silicic acid (see FIG. 3), 0.5 M of silicic acid (see FIG. 4), and 0.7 M of silicic acid (see FIG. 5).

Figure 6:
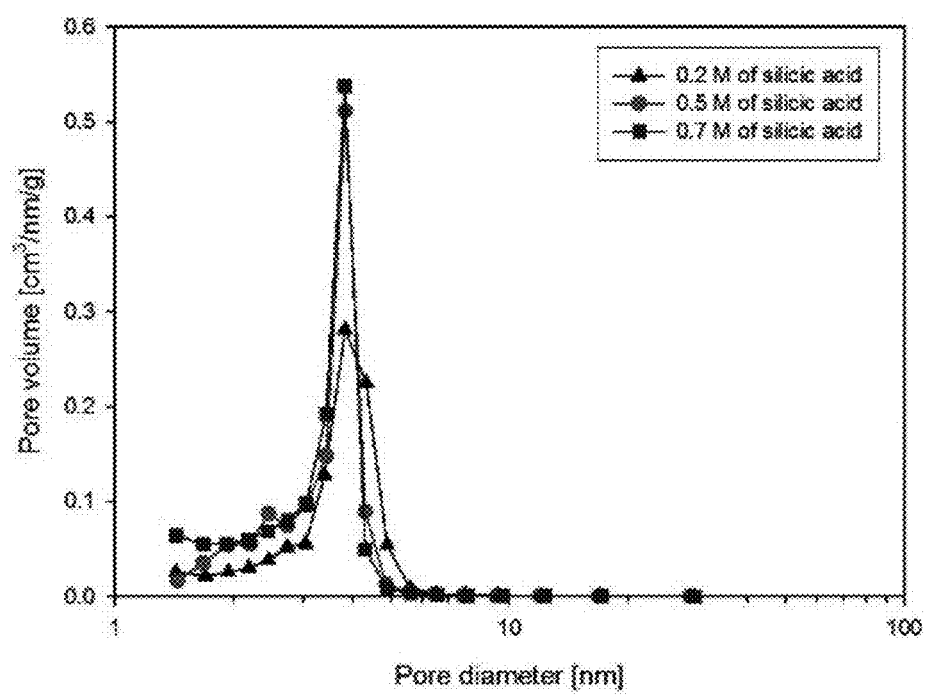
FIG. 6 is a graph showing the distribution of pore volumes of silica particles prepared by using aqueous silicic acids having 0.2 M, 0.5 M and 0.7 M of the silicic acids.
Figure 7:
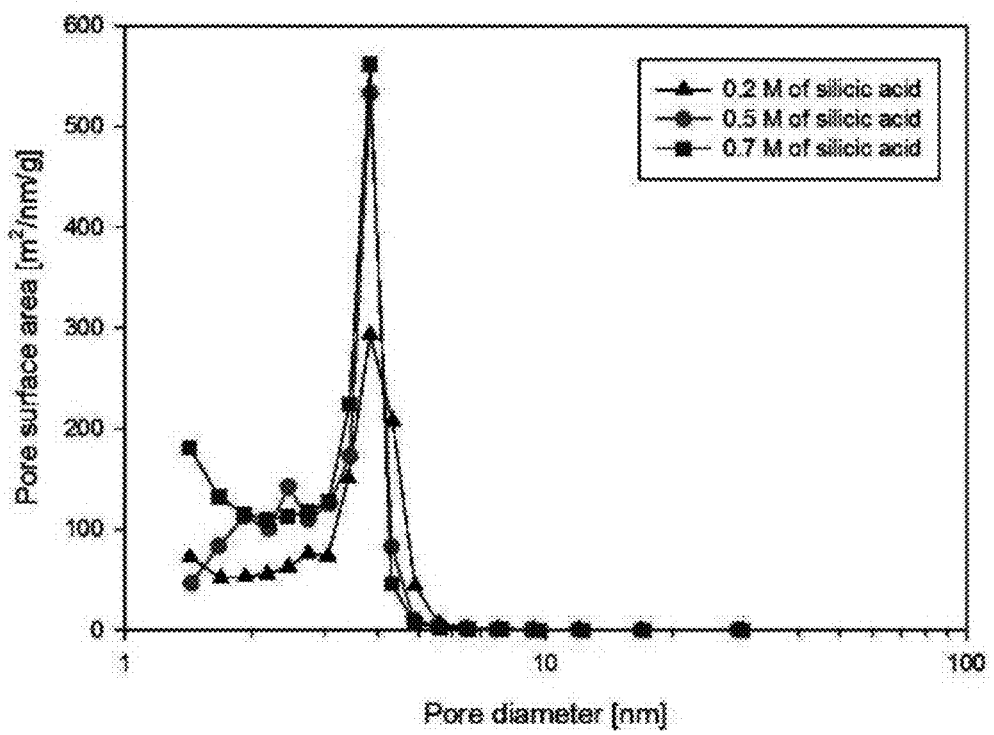
FIG. 7 is a graph showing the distribution of specific pore surface areas of silica particles prepared by using aqueous silicic acids having 0.2 M, 0.5 M and 0.7 M of the silicic acids.

FIG. 6 is a graph showing the distribution of pore volumes of silica particles prepared by using aqueous silicic acids having 0.2 M, 0.5 M and 0.7 M of the silicic acids. FIG. 7 is a graph showing the distribution of specific pore surface areas of silica particles prepared by using aqueous silicic acids having 0.2 M, 0.5 M and 0.7 M of the silicic acids.

In addition, the average particle size, the total pore volume, and the specific surface area of the prepared silica particles are shown in table 1 according to the variation of the concentrations of the aqueous silicic acid.

In this case, the temperature of the reactor was 700° C., and the carrier gas was air flowing at the flow rate of 1 L/min.

TABLE 1

| | Porous Silica Particles | | |
|---|---|---|---|
| Concentration of silicic acid | average particle size (μm) | total pore volume (cm³/g) | specific surface area (m²/g) |
| 0.2 | 0.56 | 0.434 | 467.8 |
| 0.5 | 0.88 | 0.472 | 557.8 |
| 0.7 | 0.96 | 0.486 | 610.4 |

Referring to FIGS. 3 to 5, the shape of the prepared silica particles represents a spherical shape regardless of the concentration of the aqueous silicic acid. In addition, regarding the distribution of the pore size of the prepared particles according to the concentrations of the aqueous silicic acid with reference to FIGS. 6 and 7, the distribution of the pores is greatly represented when the pore size is 3.8 nm regardless of the concentrations of the aqueous silicic acid. Accordingly, it can be recognized from the above description that the to produced particles are mesoporous particles.

However, referring to FIGS. 3 to 5, and table 1, as the concentration of the aqueous silicic acid is increased from 0.2 M to 0.7 M, the average particle size is increased from 0.56 μm to 0.96 μm. Accordingly, on the assumption that the sprayed droplets have the same size regardless of the concentration of the aqueous silicic acid, and the produced particles have the same porosity, the particle size of the particles produced through the spray pyrolysis process, in which one particle is produced from one droplet, is increased as the concentration of the aqueous silicic acid is increased.

Meanwhile, referring to table 1, as the concentration of the aqueous silicic acid is increased from 0.2 M to 0.7 M, the pore volume of the particles is increased from 0.434 cm³/g to 0.486 cm³/g, and the specific surface are of the particles is increased from 467.8 m²/g to 610.4 m²/g. This is because the number of pores of the porous particles is increased as the particle size is increased. In other words, even if the same pore size and the same pore density are represented, if the particle size is increased, the number of the particles is reduced. However, since the specific surface area per particle is increased, and the number of the internal pores is increased, the pore volume and the specific surface area are increased.

(2) Result of Evaluation for Particle Characteristic According to Spray Pyrolysis Temperatures Under the condition in which the concentration of the aqueous silicic acid is 0.5 M, the porous silica particles were prepared by adjusting the temperature of the reactor to 600° C., 700° C., or 800° C., and the distribution of the pore size, the pore volume, and the specific surface area were measured. The measurement results are shown in table 23.

TABLE 2

| | porous silica particles | |
|---|---|---|
| temperature of reactor (° C.) | total pore volume (cm³/g) | specific surface area (m²/g) |
| 600 | 0.470 | 561.6 |
| 700 | 0.472 | 557.8 |
| 800 | 0.463 | 550.2 |

Referring to Table 2, as the temperature of the reactor, that is, the spray pyrolysis temperature is increased, the pore volume of the porous particles is not remarkably increased or decreased, but the specific surface area is slightly decreased. However, the important variation is not observed. In addition, the variation in the distribution of the pore sizes according to the temperature variation of the reactor is not observed, and the size of the main pore is 3.8 nm. This is because the holding time of the sprayed droplet in the reactor not only is very short, but also silica represents a very high melting point of 1600° C. or more.

(3) Result of Evaluation for Particle Characteristic According to Addition of Expansion Aid In order to evaluate the characteristic of prepared particles according to the addition of the expansion aid, urea was added to the aqueous silicic acid serving as a starting solution. In this case, the concentration of the aqueous silicic acid was fixed to 0.5 M, and the urea was added to the extent that the mole ratio of urea to silicic acid is 1. The temperature of the reactor was fixed to 700° C.

Table 3 shows the characteristic of prepared silica particles according to the addition of the expansion aid.

TABLE 3

| | porous silica particles | | |
|---|---|---|---|
| expansion aid | average particle size (μm) | total pore volume (cm³/g) | specific surface area (m²/g) |
| absence | 0.88 | 0.472 | 557.8 |
| presence | 0.94 | 0.500 | 595.6 |

Referring to table 3, when urea is added as the expansion aid, the average particle size, the pore volume, and the specific surface area of the particle are slightly increased as compare with the case in which urea is not contained. This is because the urea generates $CO_2$ and $N_2$ gas and vapor when the urea is subject to the oxidation reaction, so that the pore volume and the specific surface area of the silica particles are increased.

Meanwhile, the variation in the shape of the silica particles prepared by adding urea and the distribution of the pore sizes of the silica particles is not observed.

(4) Result of Evaluation for Particle Characteristic According to Addition of Organic Template In order to evaluate the characteristic of prepared particles according to the addition of the organic template, PEG was added to the aqueous silicic acid serving as a starting solution. In this case, the concentration of the aqueous silicic acid was fixed to 0.5 M, and the temperature of the reactor was fixed to 700° C. The PEG was removed in the spray pyrolysis, and residual carbon components were removed through additional heat treatment.

Figure 8:
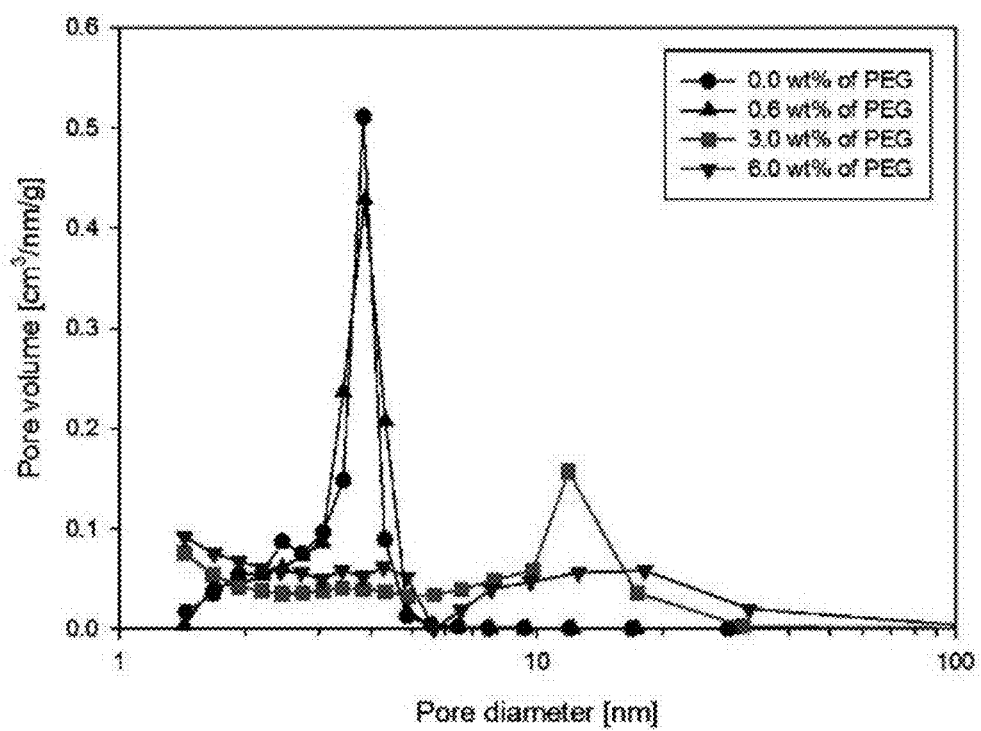
FIG. 8 is a graph showing the distribution of pore volumes of silica particles prepared by using aqueous silicic acids including 0.6 wt %, 3.0 wt %, and 6.0 wt % of PEG.
Figure 9:
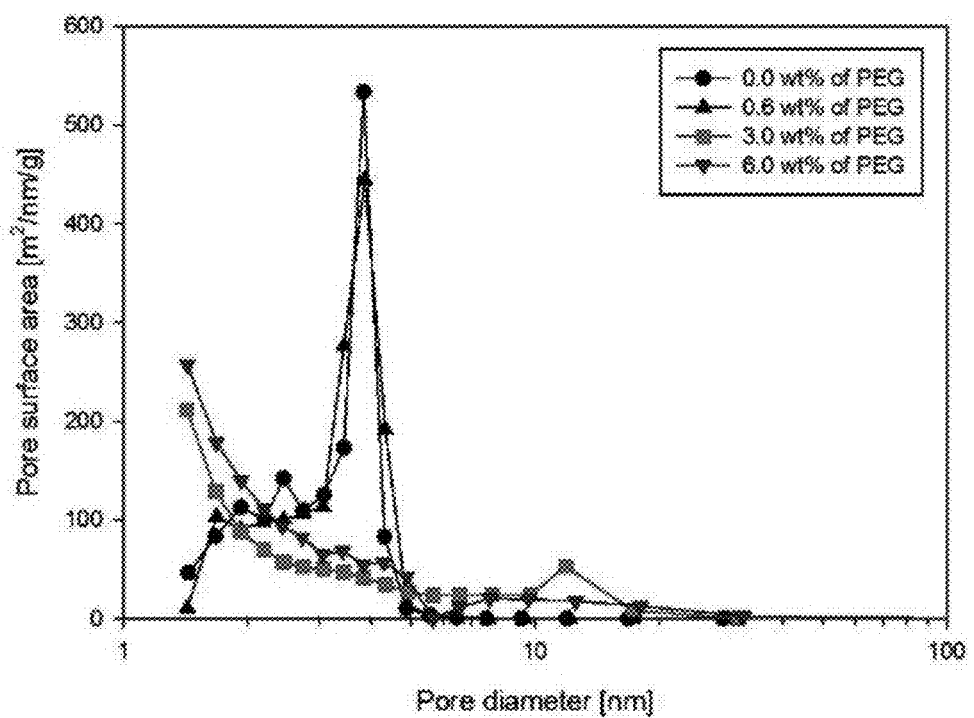
FIG. 9 is a graph showing the distribution of specific pore surface areas of silica particles prepared by using aqueous silicic acids including 0.6 wt %, 3.0 wt %, and 6.0 wt % of PEG.

FIG. 8 is a graph showing the distribution of pore volumes of silica particles prepared by using aqueous silicic acids including 0.6 wt %, 3.0 wt %, and 6.0 wt % of PEG; and FIG. 9 is a graph showing the distribution of specific pore surface areas of silica particles prepared by using aqueous silicic acids including 0.6 wt %, 3.0 wt %, and 6.0 wt % of PEG. In FIGS. 8 and 9, the contents of the organic template are marked as 0.6 wt %, 3.0 wt %, and 6.0 wt %.

Figure 10:
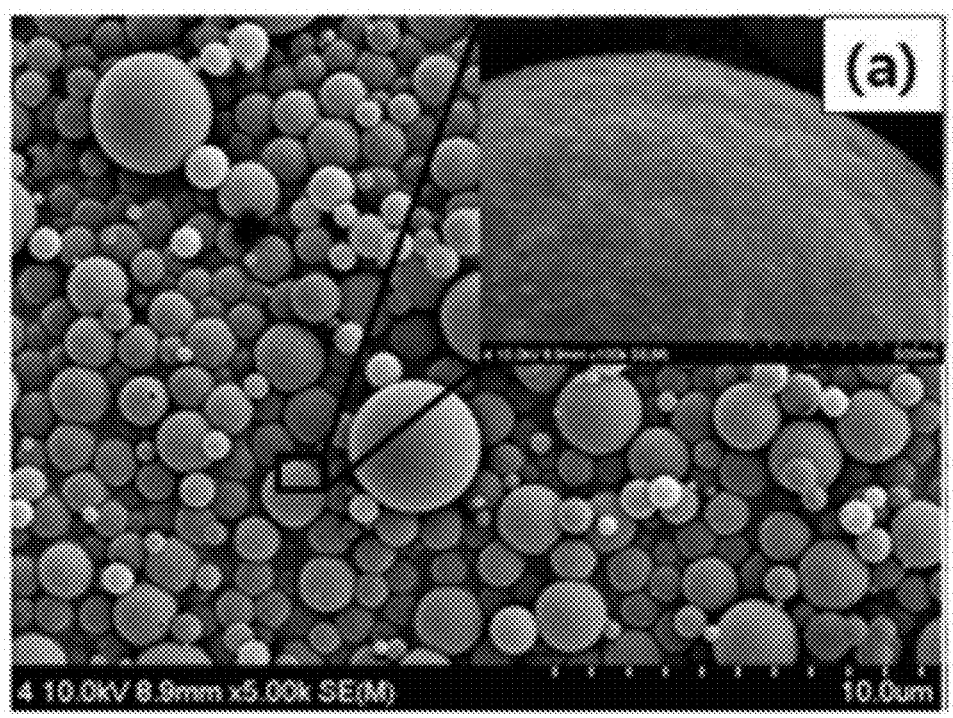
FIGS. 10 to 12 are FE-SEM photographs showing silica particles prepared by using aqueous silicic acids including 0.6 wt %, 3.0 wt %, and 6.0 wt % of PEG.
Figure 11:
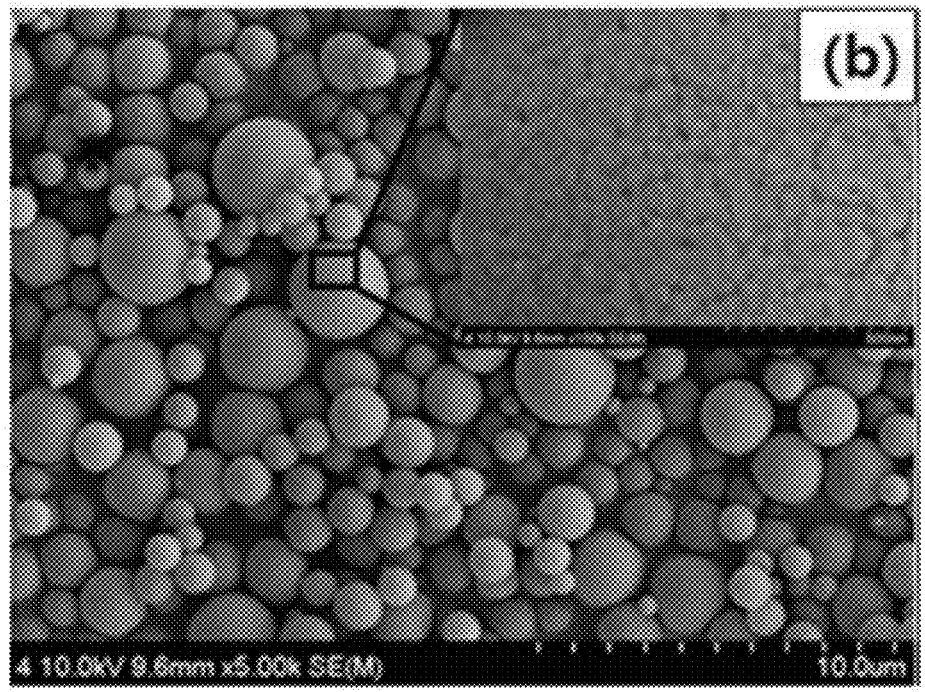
Figure 12:
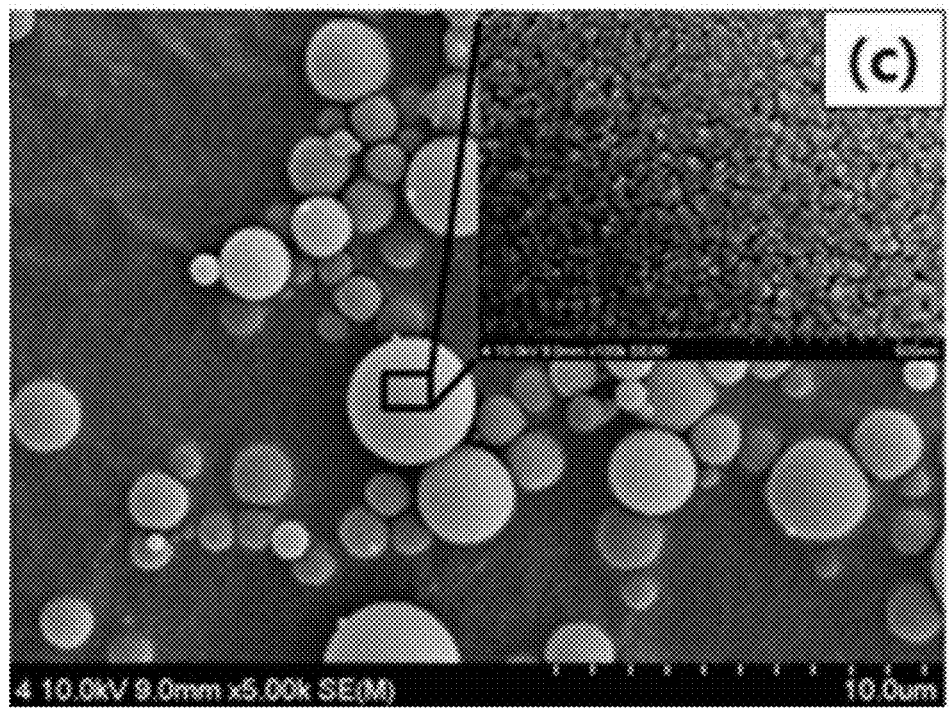

FIGS. 10 to 12 are FE-SEM photographs showing silica particles prepared by using aqueous silicic acids including 0.6 wt %, 3.0 wt %, and 6.0 wt % of PEG.

In addition, table 4 shows the characteristic of the prepared silica particles according to the contents of the PEG.

TABLE 4

| | porous silica particles | |
|---|---|---|
| organic template (wt %) | total pore volume (cm³/g) | specific surface area (m²/g) |
| 0 | 0.472 | 557.8 |
| 0.6 | 0.601 | 554.0 |
| 3.0 | 1223 | 528.0 |
| 6.0 | 1.654 | 566.1 |

Referring to FIGS. 8 to 12, and table 4, as the content of the PEG is increased, the pore size is increased, and the pore distribution is expanded.

Meanwhile, as the content of the PEG is increased, the pore volume of the porous silica particles is significantly increased, but the great variation in the specific surface area of the silica particles is not observed as compared with a case in which the PEG is not contained in the aqueous silicic acid.

The PEG contained as the organic template is pyrolyzed to leave pores. Accordingly, the number of pores of the silica particles not only is increased, but also the pore size is increased, so that the pore volume is increased. However, since the increase of the pore size reduces the surface area per pore, the great variation in the specific surface area of the particles is not observed even though the number of the pores is increased.

Although the present invention has been described by making reference to the embodiments and accompanying drawings, it should be understood that the present invention is not limited to the embodiments but includes all modifications, equivalents and alternatives. Accordingly, those skilled in the art should understand the spirit and scope of the present invention as defined in the following claims. In addition, those skilled in the art should understand that the equivalents and the modifications belong to the scope of the spirit of the present invention.

What is claimed is:

1. A method of preparing mesoporous silica particles, the method comprising:
   (a) preparing an aqueous silicic acid;
   (b) spraying the aqueous silicic acid in a droplet state by activating the aqueous silicic acid; and
   (c) pyrolyzing the sprayed droplet through a reactor, which is previously heated at a temperature of 550° C. to 850° C., by allowing the sprayed droplet to pass through the reactor together with a carrier gas to prepare the mesoporous silica particles with a 3.8 nm main pore,
   wherein the aqueous silicic acid includes 0.4 M to 0.8 M of silicic acid, the aqueous silicic acid further includes urea as an expansion aid, the urea having a concentration of 2 M based on 1 M of the aqueous silicic acid.

2. The method of claim 1, wherein the spraying of the aqueous silicic acid in the droplet state by activating the aqueous silicic acid is performed through an ultrasonic spraying scheme.

3. The method of claim 1, wherein the aqueous silicic acid further includes an organic template.

4. The method of claim 3, wherein the organic template includes at least one of polyethylene glycol (PEG), polypropylene glycol (PPG), and polyvinyl pyrrolidone (PVP).

5. The method of claim 3, wherein the organic template is contained with a content of 10.0 weight part or less based on 100 weight part of the aqueous silicic acid.

* * * * *